United States Patent
Daily

(10) Patent No.: US 9,617,483 B2
(45) Date of Patent: Apr. 11, 2017

(54) CONTROLLING TEMPERATURE WITHIN A CATALYST BED IN A REACTOR VESSEL

(71) Applicant: Jeffrey N. Daily, Houston, TX (US)

(72) Inventor: Jeffrey N. Daily, Houston, TX (US)

( * ) Notice: Subject to any disclaimer, the term of this patent is extended or adjusted under 35 U.S.C. 154(b) by 286 days.

(21) Appl. No.: 14/091,027

(22) Filed: Nov. 26, 2013

(65) Prior Publication Data
US 2014/0083905 A1    Mar. 27, 2014

Related U.S. Application Data

(63) Continuation of application No. 13/154,111, filed on Jun. 6, 2011, now Pat. No. 8,617,385.

(51) Int. Cl.
*C10G 45/72* (2006.01)
*C10G 47/36* (2006.01)
(Continued)

(52) U.S. Cl.
CPC ............ *C10G 45/72* (2013.01); *B01J 8/0285* (2013.01); *B01J 8/0453* (2013.01); *B01J 8/0492* (2013.01); *B01J 8/0496* (2013.01); *C10G 47/36* (2013.01); *C10G 49/26* (2013.01); *C10G 65/02* (2013.01); *B01J 2208/00061* (2013.01); *B01J 2208/00353* (2013.01); *B01J 2208/00548* (2013.01); *B01J 2208/00911* (2013.01); *B01J 2219/002* (2013.01); *B01J 2219/00213* (2013.01);
(Continued)

(58) Field of Classification Search
CPC .... B01J 2208/00061; B01J 2208/00353; B01J 2208/00548; B01J 2208/00911; B01J 2219/002; B01J 2219/00213; B01J 2219/00234; B01J 2219/00238; B01J 8/0453; B01J 8/0492; B01J 8/0496; C10G 2300/4006; C10G 45/72; C10G 47/36; C10G 49/26; C10G 65/02
See application file for complete search history.

(56) References Cited

U.S. PATENT DOCUMENTS 2,383,729 A    8/1945    Loy
3,442,627 A    5/1969    Wilkinson
(Continued)

FOREIGN PATENT DOCUMENTS

| KR | 102010008738 | 8/2010 |
| WO | 02/20856 | 4/2002 |

OTHER PUBLICATIONS

PCT International Search Report, dated Feb. 14, 2013.
European Search Report, dated Nov. 25, 2015.

*Primary Examiner* — Renee Robinson
*Assistant Examiner* — Derek Mueller
(74) *Attorney, Agent, or Firm* — Duane Morris LLP; Diana Sangalli

(57) ABSTRACT

A quenching medium is delivered directly to selected regions or locations within a catalyst bed in a hydroprocessing reactor vessel in order to control the reactivity of a hydroprocess occurring in the selected regions or locations separately from other regions or locations. Temperature sensors for providing temperature indications and conduits for delivering the quench medium are distributed throughout the catalyst bed. One or more conduits can be selected for delivery of the quenching medium to selected regions or locations so that separate control of the level of reactivity in each of various regions or locations throughout the bed can be achieved.

5 Claims, 4 Drawing Sheets

(51) Int. Cl.
*C10G 49/26* (2006.01)
*B01J 8/04* (2006.01)
*C10G 65/02* (2006.01)
*B01J 8/02* (2006.01)

(52) U.S. Cl.
CPC ........ *B01J 2219/00234* (2013.01); *B01J 2219/00238* (2013.01); *C10G 2300/4006* (2013.01)

(56) References Cited

U.S. PATENT DOCUMENTS

| | | | |
|---|---|---|---|
| 3,492,099 A * | 1/1970 | Sze | ............ B01J 8/0005 422/148 |
| 3,591,345 A | 7/1971 | Hochman | |
| 3,981,793 A | 9/1976 | Christie | |
| 4,707,245 A | 11/1987 | Baldasarri | |
| 5,648,051 A | 7/1997 | Trimble | |
| 5,989,502 A | 11/1999 | Nelson | |
| 6,299,759 B1 | 10/2001 | Bradway | |
| 6,550,963 B2 | 4/2003 | Daily | |
| 6,599,011 B2 | 7/2003 | Daily | |
| 7,112,312 B2 | 9/2006 | Chou | |
| 7,314,602 B2 | 1/2008 | Raynal | |
| 2002/0182119 A1 | 12/2002 | Daily | |

* cited by examiner

CONTROLLING TEMPERATURE WITHIN A CATALYST BED IN A REACTOR VESSEL

RELATED APPLICATIONS

This application is a continuation of U.S. application Ser. No. 13/154,111 filed on Jun. 6, 2011, the entirety of which is incorporated by reference herein.

TECHNICAL FIELD

The present invention relates generally to controlling temperature, and, more particularly, to controlling temperature within a catalyst bed in a hydroprocessing reactor vessel.

BACKGROUND

The petrochemical and refining industries generally process or treat a hydrocarbon material using various catalytic processes that are carried out in a reactor vessel. Typically, such processes involve reacting the hydrocarbon material with hydrogen in a series of catalyst beds, each of which is made up of a material that is suited for the type of hydroprocess performed in the particular bed. These processes are performed at high temperatures, which must be controlled to ensure that the process is carried out efficiently and with maximum yield, but without damaging the materials that make up the catalyst beds. Some degree of temperature control is generally achieved by mixing the hot hydrocarbon liquid feed stream with a cooler stream of hydrogen gas that is provided from an external source. This mixing occurs in quench zones that are provided above each catalyst bed. For instance, in many reactors, the mixing of the reactant streams in the quench zones is performed by a mixing device that is located above a distribution plate or tray in the quench zone that collects the mixed reactants and then distributes the mixture across the top of the underlying catalyst bed with the objective of achieving a uniform temperature distribution throughout the bed.

However, while the mixing and distribution of reactants may serve to generally control the temperature of the hydroprocess, a uniform temperature distribution throughout the bed often is not achieved. For instance, because the hydroprocess is exothermic, a temperature profile of the bed generally should indicate an increase in temperature from the top to the bottom of the bed. However, situations can arise where the temperature within a particular region or at a particular spot in the catalyst bed is higher or lower than expected. Such situations can occur due to inadequate mixing of the reactants so that the hotter hydrocarbon feed is not uniformly saturated with the cooler hydrogen gas or as a result of non-uniform distribution of the mixed reactants across the surface of the bed by the distribution tray, either of which may arise, for instance, due to obstruction of feed nozzles and/or distribution outlets. Additionally, hot spots or regions in the catalyst bed can result from uneven flow of the reactants through the catalyst bed due to regions in which the catalyst material is packed less densely than in other regions, the presence of impurities in the catalyst material, or regions in which the catalyst material has been damaged, such as due to coking. In other situations, the catalyst within certain regions may wear more quickly than in other regions, resulting in regions of lower reactivity and, consequently, temperatures that are lower than optimal. Any of these situations can produce undesirable results, since they can lead, for instance, to compromises in product yield, inefficient utilization of catalyst material, premature replacement of the catalyst bed, and/or dangerous "runaway" or upset conditions.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Embodiments of the invention achieve improved control over the temperature distribution throughout a catalyst bed in a reactor vessel by providing for separate control of the temperature at each of a plurality of different regions or locations within the bed. By providing for separate control of temperature throughout the bed, the reactivity level of the hydroprocess occurring within the catalyst bed may be adjusted to compensate for variations in the characteristics of the catalyst material throughout the bed and/or variations in the hydrocarbon feed mixture distributed across the bed. For instance, regions in the bed that have elevated temperatures, such as due to coking, channeling, or maldistribution of the catalyst material, can be cooled relative to regions in which the characteristics of the catalyst material do not contribute to elevated temperatures. In another example, lower-than-expected temperatures in the bed may be indicative of a region in which the catalyst material has experienced more wear than the catalyst in other regions and, consequently, the hydroprocess within that region has a lower level of reactivity. Embodiments of the invention can increase the level of reactivity in the more worn region by increasing temperature throughout the entire bed and then cooling only those regions in which temperature measurements indicate that the catalyst material is less worn. By tailoring temperature control to the characteristics of each region or location rather than implementing a single temperature control scheme that applies to the entire bed, product yield can be improved, the catalyst can be used more efficiently, and dangerous operating events can be more readily avoided.

Figure 1:
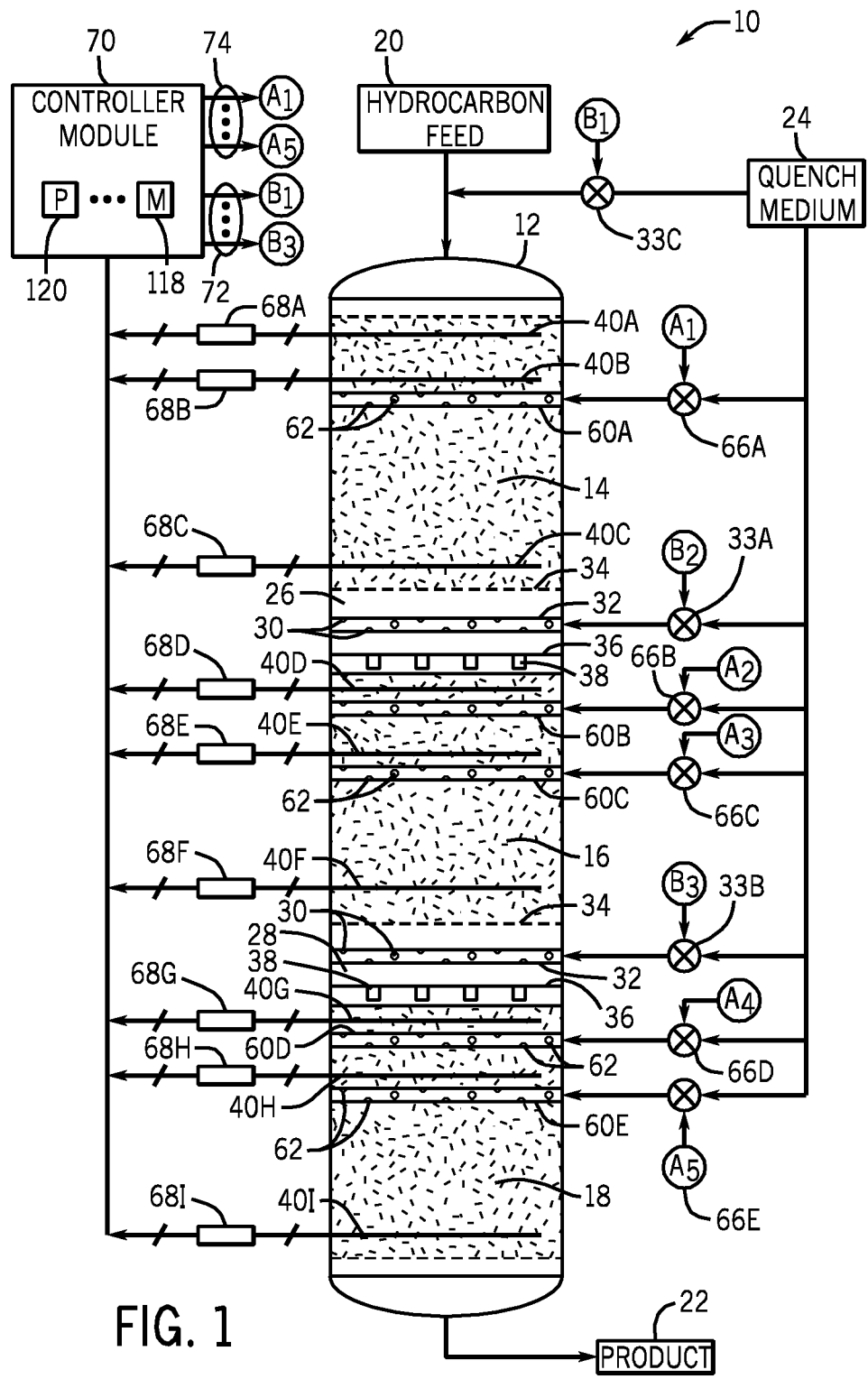
FIG. 1 is a schematic representation of an exemplary system including a reactor vessel having a catalyst bed in which the temperature control technique and system can be implemented in accordance with an illustrative embodiment.

Referring generally now to FIG. 1, a schematic representation is provided of a system 10 in which exemplary embodiments of the invention can be implemented. System 10 includes a reactor vessel 12 containing a plurality of vertically spaced hydroprocessing catalyst beds 14, 16 and 18. Although three catalyst beds are shown, it should be understood that the vessel 12 may contain less or more than three catalyst beds, as may be appropriate for the particular hydrocarbon material and the particular hydroprocess(es) or hydrotreatment(s) performed. In the embodiment shown, a feed stream of a hydrocarbon component 20 to be processed is introduced into the top of the vessel 12 so that the feed 20 can thereafter flow downwardly through the series of vertically spaced catalyst beds 14, 16, 18 and exit the vessel 12 as product 22. A quench component or medium 24, such as hydrogen gas or liquid, also is introduced into the vessel 12, such as at the top of the vessel 12 along with the hydrocarbon component 20. The quench component 24 also may be introduced through delivery ports 30 of respective quench pipes 32 at various quench zones 26, 28 where a mixing device (not shown) mixes the quench component 24 with the hydrocarbon stream flowing into the zones 26, 28 from the overlying catalyst beds. The quench component 24, which is at a lower temperature than the hydrocarbon stream, generally is used to adjust the temperature of the mixture in the quench zones 26, 28 with the goal of ensuring that the process in the catalyst beds 16, 18 occurs at a temperature that is suited for attaining a maximum yield while not damaging the catalyst material. If hydrogen gas or liquid is used as the quench component 24, quenching also serves to replenish any hydrogen lost by the hydrocarbon stream due to exothermic reactions in the quench zones 26, 28.

In general, each quench zone 26, 28 is defined by a support screen 34, which supports the overlying catalyst bed, and a distribution tray 36, which redistributes the feed mixture across the top of the underlying catalyst bed through delivery ports 38. One or more temperature sensing devices 40A-I (e.g., thermocouples) are disposed at various locations in the catalyst beds 14, 16, 18 to observe temperature in the vessel 12 and to provide electrical signals representative of the observed temperature to measurement instrumentation that is exterior of the vessel 12. For instance, the temperature sensing devices 40A-I can be multipoint thermocouple devices, each of which has multiple conductor pairs of dissimilar conductive materials joined at corresponding sensing points. In the embodiment shown, multipoint temperature sensing devices 40A, 40B and 40C are positioned within the catalyst bed 14 to measure temperature within various regions of the bed 14. Multipoint temperature sensing devices 40D, E and F are positioned within the catalyst bed 16 to measure temperature within various regions of the bed 16. Although the embodiment of FIG. 1 shows one temperature sensing device 40 generally at each of the top, middle and bottom regions of each catalyst bed 14, 16 and 18, it should be understood that each device 40 may include multiple temperature sensors and that each bed 14, 16, 18 can include fewer or more devices 40. Regardless of the number of temperature sensors deployed in the beds 14, 16, and 18, the devices 40 generally are arranged to measure temperature at multiple locations within multiple regions of the bed so that horizontal and vertical distributions of temperature throughout the beds 14, 16, 18 can be observed. Based on the temperature information provided from the devices 40, decisions regarding the delivery of quench component 24 to the vessel 12 can be made.

To illustrate, in the exemplary arrangement shown in FIG. 1, the quench pipes 32 in the quench zones 26, 28 are coupled to a respective flow control valve 33A, 33B which controls the flow of the quench medium 24 to the corresponding zone 26, 28. Delivery of the quench medium 24 at the top of the vessel 12 also is controlled by a flow control valve 33C. A controller module 70 generates individual control signals at an output 72 based on the temperature indications received from one or more of the temperature sensing devices 40A-I, and provides those signals to the valves 33A-C to control the delivery of the quench medium 24 to the zones 26, 28 (and to the top of the vessel 12) and, thus, the temperature of the feed mixture that is collected and distributed by the distribution trays 36 across the underlying catalyst beds in a generally uniform manner.

Despite the temperature control provided by mixing the quenching medium with the hydrocarbon component and the distribution of the mixture across the beds 16, 18 by the distribution trays 36, optimal control of the temperature of the process occurring within the catalyst beds 16, 18 may not be achieved. Less than optimal control can result from a failure to evenly saturate the hydrocarbon component with the quenching component 24 in the quenching zone 26, 28 or from a failure to distribute the feed mixture uniformly across the catalyst beds 16, 18. Yet further, the presence of impurities in the catalyst material, contamination of the feedstock, nonuniform density of the catalyst material throughout the bed, and/or damage (e.g., coking) to the catalyst material due to excessive temperatures can lead to spots or regions where the temperature is not at a desired level so that additional coking, maldistribution or channeling occurs. Still further, upset conditions may occur in which the reaction "runs away" to an uncontrolled level. Additionally, various conditions of the catalyst (such as increased wear in certain regions) may require different temperatures to achieve a desired reactivity level within the bed.

Figure 2:
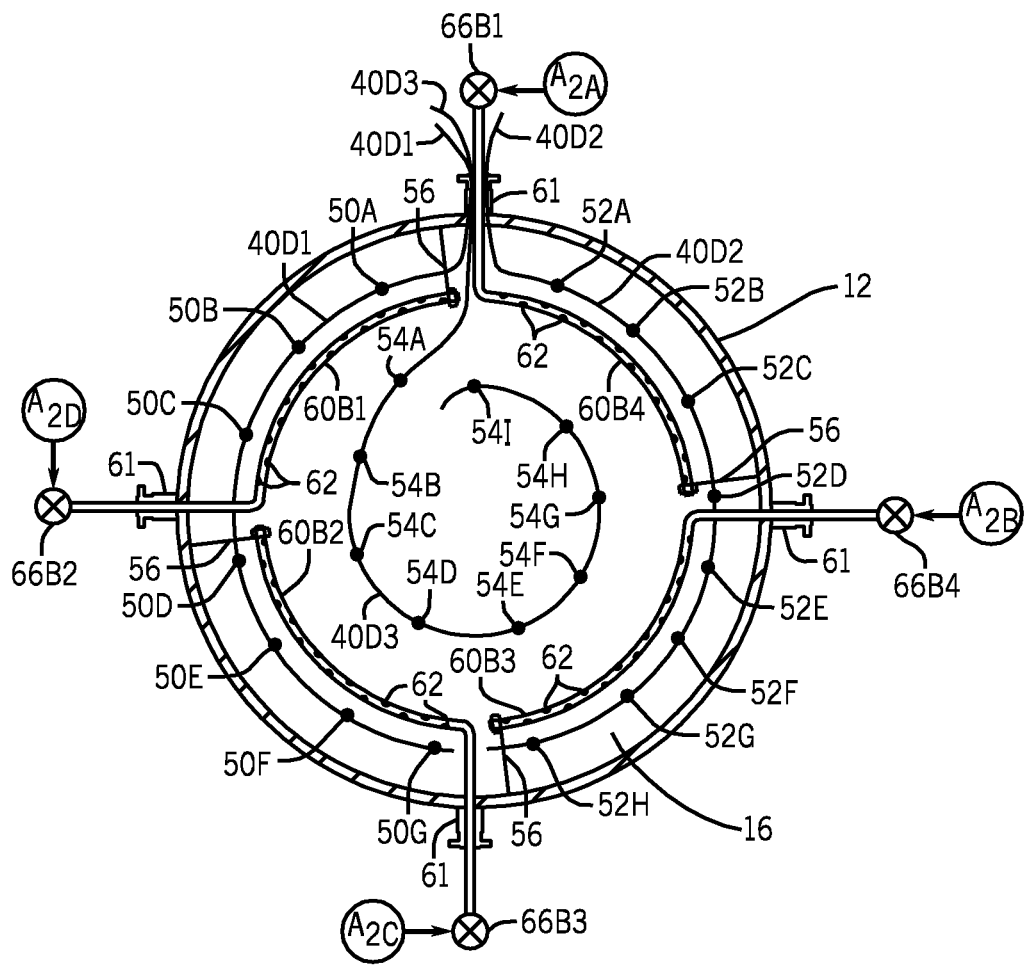
FIG. 2 is a schematic cross-sectional view of an exemplary temperature control arrangement deployed at an upper level of a catalyst bed of FIG. 1, according to an illustrative embodiment.

Accordingly, to compensate for situations that result in uneven temperature distributions or that would benefit from nonuniform temperature control, exemplary embodiments of the invention control temperature within the catalyst beds 14, 16, 18 in a manner in which the temperature within specific regions or at specific locations of the bed can be controlled separately from others so as to achieve a desired temperature distribution, and consequently, a desired level of reactivity throughout the entire bed. Towards that end, the temperature sensing devices 40A-I shown in FIG. 1 are arranged to observe temperature within multiple regions of the catalyst beds 14, 16 and 18. The regions may be at different elevation levels or may be different areas within a particular elevation level. An illustrative arrangement of a temperature sensing device having multiple sensing points distributed throughout multiple regions at a particular level within a catalyst bed is shown in the schematic cross-sectional view of FIG. 2, which shows the upper level of bed 16. In FIG. 2, the temperature sensing device 40C includes multipoint thermocouples 40C1, 40C2 and 40C3. Multipoint thermocouple 40C1 includes temperature sensing points 50A-G that are arranged generally about a portion of the outer perimeter of the catalyst bed 16 to observe temperature within that peripheral region. Multipoint thermocouple 40C2, which includes sensing points 52A-H, is arranged generally about another portion of the outer perimeter of the catalyst bed 16 to observe temperature within that peripheral region. Multipoint thermocouple 40C3 includes sensing points 54A-I and is arranged so that it follows an arcuate path inside of the thermocouple devices 40C1 and 40C2 to measure temperature at multiple locations within the inner central region of the upper elevation level of the bed 16. Each thermocouple device 40C1, 40C2, 40C3 may be supported and retained in position within the catalyst bed 16 by appropriate mounting brackets and hardware 56.

It should be understood that fewer or more thermocouple devices 40C may be deployed within the catalyst bed 16 at the particular elevation level shown in FIG. 2 or at any of the different elevation levels throughout the bed. Each thermocouple device 40C may include more or fewer sensing points than those shown in FIG. 2. For instance, the upper elevation level shown in FIG. 2 may include only one multipoint thermocouple and that thermocouple may have five sensing points. In other embodiments, there may be only a single sensing point at a particular level or as many as one hundred sensing points, depending on the particular system in which the temperature sensing devices are deployed. In addition, the temperature sensing points may be arranged uniformly throughout the bed or throughout a selected region or level of the bed or may be arranged in a non-uniform manner. The temperature sensing points may be offset from one another in a radial direction but not offset in a vertical direction such that the points are all distributed substantially at a single elevation of the bed. Alternatively, the temperature sensing points may be offset from one another in both radial and vertical directions so as to provide temperature measurements that are radially and vertically distributed throughout the bed. The temperature sensing devices preferably are multipoint temperature sensors, but single point sensors also may be employed instead of or in conjunction with multipoint sensors.

With reference now to FIGS. 1 and 2, selective temperature control of each of a plurality of regions within a catalyst bed is implemented by deploying one or more conduits, such as quench pipes 60A-E, within each of the beds 14, 16, 18 in regions proximate respective temperature sensing devices 40. In general, the quench pipes 60A-E can be configured in the same manner as the quench pipes 32 in the quench zones 26, 28. For instance, pipes 60A-E can be made of tubing (e.g., half-inch to three-inch stainless steel tubing) having multiple delivery ports 62 formed in and distributed longitudinally and circumferentially along the pipe 60. Each of the pipes 60A-E is coupled to a respective separately controlled flow control valve 66A-E through which the quench component 24 is delivered based on the temperature indications received from the temperature sensing devices 40, as will be explained in further detail below.

FIG. 1 shows the quench pipes 60A-E deployed only at the top and middle elevation levels of each catalyst bed 14, 16, 18. It should be understood, however, that additional quench pipes 60 can be deployed at multiple elevation levels within each catalyst bed 14, 16, 18, such as at levels that are intermediate the top and middle levels, or below the middle level so that the temperature of the hydroprocess occurring in the bed can be independently controlled within each vertical region of the bed in which a conduit 60 is deployed. Additionally or alternatively, multiple conduits 60 can be deployed at only a single level within the bed so that the temperature of the hydroprocess occurring in the bed can be independently controlled within each horizontal region at that level. Temperature sensors can also be deployed at each elevation level that includes a quench pipe. Alternatively, certain levels may include only a temperature sensor or only a quench pipe or may not include either a sensor or a pipe.

With reference again to the schematic cross-sectional view in FIG. 2 (which shows one elevation level within the bed 16), quench pipe 60B is provided as separate conduits 60B1, 60B2, 60B3 and 60B4, which exit the vessel 12 through respective pressure-sealed flange openings 61 and are coupled to separately controlled respective flow control valves 66B1, 66B2, 66B3, 66B4, which are controlled via respective control signals A2A, A2B, A2C and A2D. Thus, the elevation level shown in FIG. 2 is an example of a vertical region that includes four horizontal regions in which temperature can be separately controlled. In the embodiment shown, pipe 60B1 is deployed in the general region of sensing points 50A, 50B, 50C, 54A and 54B; pipe 60B2 is deployed in the general region of sensing points 50D, 50E, 50F, 50G, 54C and 54D; pipe 60B3 is deployed in the general region of sensing points 52E, 52F, 52G, 52H, 54E, and 54F; and pipe 60B4 is deployed in the general region of sensing points 52A, 52B, 52C, 52D, 54G, 54H and 54I. In certain embodiments, the pipes 60B1-60B4 are vertically spaced apart from the temperature sensors 40D1-40D3 such as by 3-12 inches, so that the sensing points can provide indications of the temperature within the catalyst bed 16 that are not overwhelmed by the temperature of the quench component 24 that is selectively delivered by the pipes 60B1-60B4.

Each of the sensing points 50, 52, 54 is formed at the junction of conductor pairs contained within each thermocouple device 40D1, 40D2, 40D3. The various conductor pairs are coupled to a terminal box 68D exterior of the vessel 12 to provide electrical signals representative of temperature to the controller module 70. The various conductor pairs that provide the sensing points for each of the other temperature sensing devices 40A, 40B, 40C, 40E, 40F, 40G, 40H, 40I are similarly coupled to respective terminal boxes 68A, 68B, 68C, 68E, 68F, 68G, 68H, 68I so that signals representative of the temperature observed by those devices also are provided to controller module 70. Based on these temperature indications, the controller module 70 can develop a temperature profile of the bed from which it can determine whether particular regions or locations within the beds have, or are developing, temperatures that will not result in the desired level of reactivity of the hydroprocess occurring in the bed or that may otherwise produce an undesirable operating condition or event.

For instance, the temperature profile may indicate that the temperatures at particular regions or locations are higher than a predetermined threshold temperature or that the temperature differential between regions is higher than a predetermined threshold value. Here, these regions of higher temperatures are referred to as "hot zones" and particular locations are referred to as "hot spots." As an example, a temperature differential of 2-10 F relative to an adjacent region could be indicative of a hot zone or spot. A runaway condition could be indicated by an increase in temperature of 100-200 F. If a hot zone, hot spot or other undesirable thermal operating condition is identified, the controller module 70 can generate one or more control signals at an output 74 to selectively and independently control the appropriate flow control valve(s) 66 so that the quenching medium 24 can be selectively delivered to only those one or more regions or locations in the bed that contain or are proximate the hot zone or spot or region that is exhibiting the undesired thermal condition.

In other situations, the temperature profile may indicate that the temperatures at particular regions or locations are lower than a threshold temperature or that the increase in temperature between vertical regions is less than expected. For instance, low temperatures or low temperature differentials may occur when the catalyst in a particular region has become worn so that the level of reactivity of the hydroprocess in that region is less than in other regions. In such situations, a higher temperature in the worn region relative to regions of less wear is desirable to raise the level of reactivity in the worn region. To address this situation, the temperature of the mixture provided to the bed can be increased to increase the reactivity in the worn region. The quenching medium then can be selectively delivered directly to the less worn regions in order to cool those regions relative to the worn region. In this manner, selective and independent control of the temperature in or at each of a plurality of regions or locations within a single bed can be achieved to compensate for different characteristics or conditions of the catalyst within the various regions so that a desired level of reactivity of the hydroprocess throughout the bed results.

An illustrative example of selectively quenching a selected region independently of other zones or regions within the catalyst bed can be described with reference to FIG. 2. In this example, temperature indications are provided to the controller module 70 from the devices 40D1, 40D2 and 40D3. The temperature indications corresponding to sensing points 54C, 54D, 50E and 50F indicate that the temperature in the region proximate those sensing points is higher than adjacent regions (such as by a predetermined threshold amount, e.g., 2-5° F.). The controller module 70 thus identifies that region in the bed 16 as a hot zone and generates a control signal at the output 74 to activate control valve 66B3. As a result, the quench medium 24 is delivered directly to the hot zone in the bed 16 via the quench conduit 60B2, but not to the surrounding regions. Similarly, if temperature indications corresponding to sensing points 54E, 54F and 54G also are elevated, then the controller module 70 generates a control signal at output 74 to activate control valve 66B4 so that the quench medium 24 is delivered to the region of the bed 16 that is in the vicinity of the quench conduit 60B3.

An illustrative example of selectively elevating the temperature in a particular region relative to other regions within the bed can also be described with reference to FIG. 2. Here, temperature indications corresponding to sensing points 54C, 54D, 50E and 50F indicate that the temperature in the region proximate those sensing points is too low (i.e., a cool region) and, thus, corresponds to a situation in which the reactivity level of the hydroprocess in that region is less than optimal. Alternatively, the temperature indications from points 54C, 54D, 50E and 50F relative to points 54E, 54F, 54G, 52H and 52G may indicate that the temperature differential is less than expected. In either case, the controller module 70 can identify a region in the bed 16 as a cool zone (e.g., the region proximate conduit 60B2) and generate a control signal at the output 72 to increase the temperature of the mixture delivered to the bed 16 from the overlying quench zone 26 by reducing the amount of quench medium 24 delivered to the zone 26 via the corresponding quench conduit 32. The controller module 70 also generates control signals at the output 74 to activate control valve 66B1, 66B2, and 66B4 (for example) so that the quench medium 24 is delivered to selected regions other than the identified cool region.

In this manner, improved control of the temperature of the catalytic process (and, thus, the reactivity level of the process) occurring in the beds 14, 16, 18 can be achieved by separately controlling the temperature within selected regions or at selected locations throughout the beds 14, 16, 18. As a result, production yield from the catalytic process can be improved and damage to the catalyst material or dangerous run-away conditions that may otherwise result from elevated temperatures can be avoided.

In various implementations, controller module 70 examines the temperate indications provided by the temperature sensors 40 in real-time, such as continuously or on a periodic basis. In this manner, the controller module 70 can determine average temperatures within the beds. Changes in the average temperatures can be monitored over time to identify trends or patterns that may be indicative of the presence or development of an undesired level (too high or too low) of reactivity in the bed. Consequently, proactive measures may be implemented by which the quench medium can be delivered within the various catalyst beds to maintain or adjust reactivity at or to a desired level so as to maximize yield and optimize utilization of the catalyst material, while avoiding damage to the catalyst and the occurrence of runaway conditions.

In some embodiments, the controller module 70 may develop a temperature profile of the entire bed and then generate control signals at output 74 based on the temperature profile. In other implementations, a temperature profile or distribution for a portion of the bed (such as a level of the bed) may be developed to identify regions or locations where temperature control may be desired. Additionally, the controller module 70 may consider the temperatures at each of the locations corresponding to the various sensing points to make control decisions.

Figure 3:
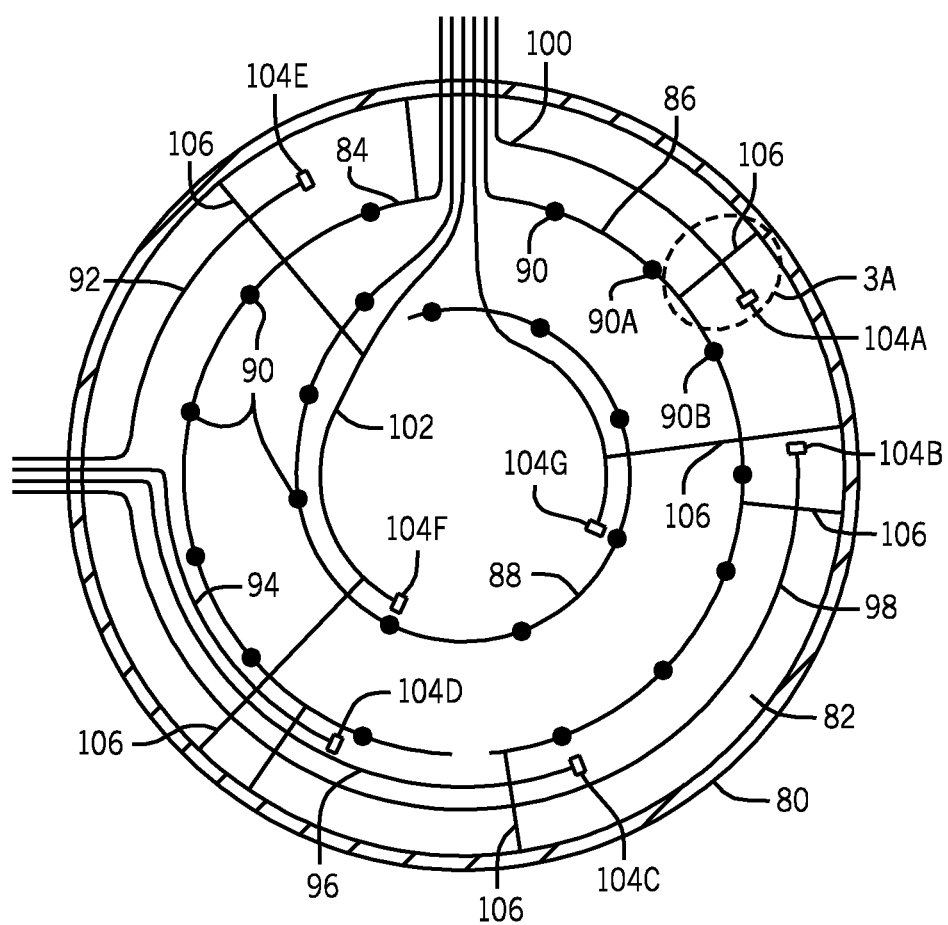
FIG. 3 is a schematic cross-section view of another exemplary temperature control arrangement deployed in a catalyst bed, according to another illustrative embodiment.

Turning now to FIG. 3, an exemplary arrangement for delivering the quench component to a spot location within a catalyst bed is shown schematically in the cross-sectional view of a vessel 80. In this embodiment, multipoint thermocouples 84, 86 and 88 are deployed within the catalyst bed 82 providing sensing points 90 that are distributed at a particular elevation in the bed 82. Spot quench conduits 92, 94, 96, 98, 100 and 102 are also deployed within the bed 82 proximate the thermocouple devices 84, 86 and 88. The quench conduits 92, 94, 96, 98, 100, 102 may be made of flexible tubing, such as half-inch tubing made of a stainless steel material, Inconel, or other material that is compatible with the particular hydroprocesses occurring in the vessel 12, and may be routed through the same flange openings as thermocouples 84, 86, 88. In the embodiment shown, conduits 92, 94, 96, 98, 100, 102 do not have delivery ports formed along the length and the circumference of the tube. Rather, each conduit 92, 94, 96, 98, 100, 102 terminates in a respective nozzle 104A-G having one or more delivery ports to deliver the quench component 24 directly to a spot location within the catalyst bed 82. Each conduit 92, 94, 96, 98, 100, 102 exits the vessel 80 through a pressure-sealed flange opening (not shown) and is coupled to a respective flow control valve (not shown) that controls the delivery of the quench component 24 via each of the spot quench conduits 92, 94, 96, 98, 100, 102 to a particular location in the catalyst bed 82 that has been identified by the controller module 70 as a hot spot. As shown in FIG. 3 and in the detail view in FIG. 3A, the various thermocouple devices 84, 86, 88 and conduits 92, 94, 96, 98, 100, 102 can be supported within the bed 82 in the vessel 80 by appropriate brackets and mounting hardware 106.

Figure 3A:
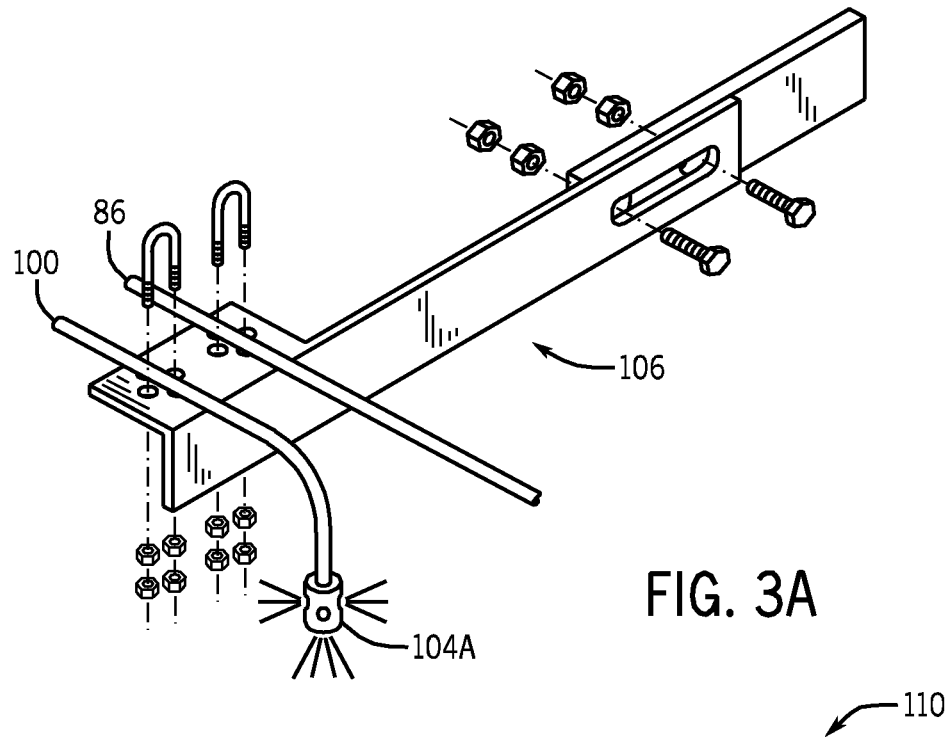
FIG. 3A is a detail drawing of the region 3A in FIG. 3.

FIG. 3A shows exemplary detail of the area 3A in FIG. 3. In the embodiment shown, the mounting hardware 106 supports the spot quench conduit 100 in a position that is proximate the multipoint thermocouple 86. The conduit 100 includes a vertical section 108 so that the nozzle 104A is spaced apart from (e.g., 3-12 inches) the thermocouple 86. In this manner, if the temperature indication from sensing point 90A and/or 90B exceeds a predetermined threshold (or is higher than adjacent points), then the controller module 70 may identify the location in the bed 82 corresponding to sensing point 90A/90B as a hot spot and issue a control signal to the appropriate flow control valve so that the quenching component 24 is delivered via the conduit 100 and the nozzle 104A directly to the identified location. In some embodiments, the temperature indications from the sensing point or points 90A, 90B that trigger delivery of the quench component 24 is an average indication derived from multiple temperature indications received from the sensing point or points 90A, 90B over a period of time. In this manner, anomalous temperature indications may be taken into account or failure of a particular sensing point may be detected so that all temperature indications from that sensing point can be disregarded.

Figure 4:
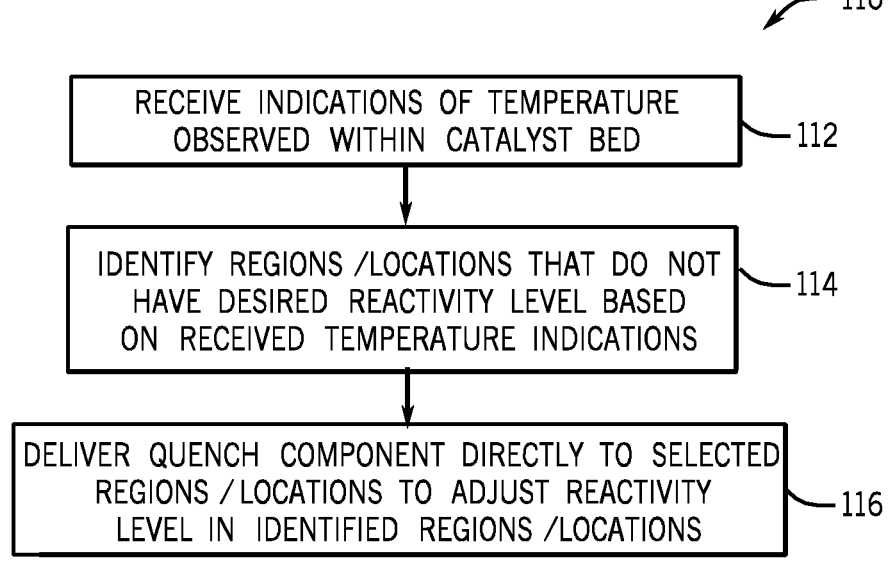
FIG. 4 is a flow chart of an exemplary temperature control technique, in accordance with an illustrative embodiment.

The flow diagram of FIG. 4 illustrates an exemplary technique 110 for independently and selectively controlling temperature in each of a plurality of regions of a catalyst bed in which one or more quench pipes are deployed within one or more regions of the bed. In block 112, indications of temperature observed by various sensing points distributed through the catalyst bed are received. Regions or locations at which the reactivity level of the hydroprocess is not at a desired level (too high or too low) are identified based on the temperature indications (block 114). A quench component is then delivered directly to only selected region(s) or location (s) in the catalyst bed to cool those regions/locations relative to other regions/locations so that a desired level of reactivity of the hydroprocess is achieved throughout the entire bed (block 116).

In the embodiment shown, the controller module 70 includes various software, hardware and/or firmware, including a memory 118 and a processing device 120, that are configured to implement the technique 110 illustrated in the flow diagram of FIG. 4, including receiving temperature indications from the sensing points of temperature sensing devices, developing vertical and horizontal temperature profiles of the bed, identifying presence or development of regions and/or locations that do not have a desired level of reactivity, and communicating appropriate control signals to deliver the quench medium to selected regions or locations to optimize the level of reactivity within the identified problem region/location. Towards that end, the memory 118 may store instructions of software code, which, when executed by the processing device 120, implement the technique 110 of FIG. 4. The processing device 120 can be implemented as a microcontroller, one or more microprocessors, or other type of computer processor-based device. The memory 118 may be implemented as one or more non-transitory computer-readable or machine-readable storage media and can include different forms of memory including semiconductor memory devices; magnetic disks such as fixed, floppy and removable disks; other magnetic media including tape; optical media such as compact disks (CDs) or digital video disks (DVDs); or other types of storage devices. The controller module 70 can be located in the vicinity of the reactor vessel 12 or may be remotely located, such as in a control room or center in a refinery or petrochemical processing plant. As yet another alternative, the controller module 70 may be configured to identify the presence or development of a region or location having an undesired level of reactivity and may provide a corresponding alert, report or other audible or graphical indication of the condition that is perceptible by a user or operator. As an example, the module 70 may generate a visual graphic of the entire bed that is color coded in a manner that represents different conditions or levels of reactivity occurring throughout the bed. The user may then determine whether corrective action is needed and, if desired, may activate appropriate flow control valves to deliver the quench medium to the identified hot zone(s) and/or spot(s).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method for use in a hydroprocessing reactor vessel containing a catalyst bed, comprising:
    observing temperature of a catalyst material within a plurality of unique regions of the catalyst material in a catalyst bed;
    controlling reactivity of a hydroprocess occurring in a first region of the unique regions of the catalyst material in the catalyst bed in response to detecting a difference between the observed temperature in the first region and the observed temperature of the catalyst material in a second region of the unique regions of the catalyst material in the catalyst bed; and
    controlling reactivity of the hydroprocess occurring in the second region of the catalyst material in the catalyst bed in response to an observed difference between the temperature of the catalyst material in the second region and the temperature of the catalyst material in the first region,
    wherein the reactivity of the hydroprocess occurring in the second region is controlled separately from controlling the reactivity of the hydroprocess occurring in the first region by selectively transporting a quench medium to one of the first and second regions and not to the other of the first and second regions;
    receiving a plurality of temperature indications corresponding to a plurality of sensing points disposed at respective unique locations within the first region and second region of the catalyst material in the catalyst bed;
    identifying one of the first and second regions as a hot zone based on the temperature indications; and
    in response to the identification of the hot zone, confining delivery of a quench medium to only a spot location within the identified one of the first region and the second region.

2. The method as recited in claim 1, further comprising selectively transporting the quench medium to the first and second regions through respective first and second quench conduits, wherein the first quench conduit has delivery ports embedded within the catalyst material in the first region and the second quench conduit has delivery ports embedded within the catalyst material in the second region.

3. The method as recited in claim 1, wherein confining delivery of the quench medium to only a spot location comprises delivering the quench medium through a delivery nozzle at a terminal end of a flexible conduit, wherein the delivery nozzle is embedded in the catalyst material at the spot location within the identified one of the first region and the second region.

4. The method as recited in claim 3, wherein observing the temperature comprises receiving a plurality of temperature indications from a multipoint thermocouple having a first plurality of junction points to provide the indications of temperature within the first region of the catalyst bed.

5. The method as recited in claim 4, wherein the multipoint thermocouple further comprises at least another junction point to provide an indication of temperature within the second region of the catalyst bed.

* * * * *